(12) United States Patent
Moler (10) Patent No.: US 10,384,733 B2
(45) Date of Patent: Aug. 20, 2019

(54) VEHICLE AND A METHOD OF MANUFACTURING THE VEHICLE

(71) Applicant: GM GLOBAL TECHNOLOGY OPERATIONS LLC, Detroit, MI (US)

(72) Inventor: Frederic M. Moler, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/846,760

(22) Filed: Dec. 19, 2017

(65) Prior Publication Data
US 2019/0185084 A1    Jun. 20, 2019

(51) Int. Cl.
*B62D 33/00* (2006.01)
*B62D 65/02* (2006.01)
*B62D 33/08* (2006.01)

(52) U.S. Cl.
CPC ........... *B62D 65/024* (2013.01); *B62D 33/08* (2013.01); *B62D 65/02* (2013.01)

(58) Field of Classification Search
CPC ...... B62D 65/02; B62D 65/034; B62D 33/04; B62D 33/08; B62D 25/06
USPC ......... 296/181.1, 181.3, 181.7, 182.1, 185.1, 296/186.1, 186.3, 186.4, 26.01, 26.04, 296/26.05
See application file for complete search history.

(56) References Cited

U.S. PATENT DOCUMENTS

| | | | | |
|---|---|---|---|---|
| 3,690,719 A | * | 9/1972 | Yount | B60P 3/34 296/100.07 |
| 3,802,732 A | * | 4/1974 | McKee | B60P 3/341 296/176 |
| 4,542,911 A | * | 9/1985 | Mulligan | B60P 3/32 280/423.1 |
| 4,603,901 A | * | 8/1986 | McIntosh | B60P 3/34 296/165 |
| 5,316,357 A | * | 5/1994 | Schroeder | B62D 27/065 296/100.07 |

(Continued)

OTHER PUBLICATIONS

Article entitled "Sportsmobile Metras Terra Camper Edition" from the webpage Sportsmobile at https://sportsmobile.com/mercedes-metris/#; accessed Oct. 20, 2017; 3 pages.

(Continued)

*Primary Examiner* — Dennis H Pedder
(74) *Attorney, Agent, or Firm* — Quinn IP Law (57) ABSTRACT

A vehicle includes a body structure defining a passenger compartment and a cargo compartment. A first roof panel is disposed over at least part of the passenger compartment and a second roof panel is disposed over at least part of the cargo compartment. A plurality of side panels surround at least the cargo compartment. A plurality of extensions are fixed to the second roof panel and coupled to the side panels. The extensions and the second roof panel are movable relative to the first roof panel and the side panels between a pre-assembled position and a final-assembled position. The second roof panel is disposed closer to the side panels when in the pre-assembled position than when in the final-assembled position. A method of manufacturing the vehicle includes providing the body structure, fixing a plurality of extensions to the second roof panel and coupling the extensions to the side panels.

20 Claims, 4 Drawing Sheets

(56) References Cited

U.S. PATENT DOCUMENTS

| | | | | |
|---|---|---|---|---|
| 6,149,218 A | * | 11/2000 | Tremblay | B60P 3/36 |
| | | | | 296/210 |
| 6,206,456 B1 | * | 3/2001 | Steury | B60P 3/34 |
| | | | | 254/45 |
| 7,226,108 B2 | * | 6/2007 | Altman | B60J 7/1614 |
| | | | | 296/100.02 |
| 7,243,965 B2 | * | 7/2007 | King | B60J 7/1614 |
| | | | | 296/164 |

OTHER PUBLICATIONS

Webpage "Supreme Corporation: Truck Bodies and Specialty Vehicles" at https://supremecorp.com; accessed Oct. 20, 2017; 2 pages.
Webpage Unicell, One Piece Fiberglass Van Bodies, at https://www.unicell.com/van-bodies/; accessed Oct. 20, 2017, 3 pages.
Webpage Knapheide Utility Van Bodies at https://www.knapheide.com/kuv-bodies/kuv-p3; accessed Oct. 20, 2017; 25 pages.
Webpage Spartan at http://www.spartanmotors.com/; accessed Oct. 20, 2017; 5 pages.

* cited by examiner

VEHICLE AND A METHOD OF MANUFACTURING THE VEHICLE

INTRODUCTION

Vehicles, such as vans, have been designed to transport cargo. Some vans have been designed with a higher roof line than other vans. The higher roof line vans do not fit onto a traditional vehicle transport trailer. Therefore, these types of vans are transported via a specially designed trailer for high roof line vehicles.

SUMMARY

The present disclosure provides a vehicle including a body structure defining a passenger compartment and a cargo compartment. The body structure includes a first roof panel disposed over at least part of the passenger compartment and includes a second roof panel disposed over at least part of the cargo compartment. The body structure also includes a plurality of side panels that surround at least the cargo compartment. The vehicle also includes a plurality of extensions fixed to the second roof panel and coupled to the side panels. The extensions and the second roof panel are movable relative to the first roof panel and the side panels between a pre-assembled position and a final-assembled position. The second roof panel is disposed closer to the side panels when in the pre-assembled position than when in the final-assembled position.

The vehicle optionally includes one or more of the following:

A) the second roof panel spaced from the side panels and the first roof panel when the second roof panel is in the final-assembled position to define a plurality of openings;

B) the openings disposed around at least the cargo compartment;

C) the openings disposed around both the passenger compartment and the cargo compartment;

D) the body structure includes a plurality of panel inserts which are separate and distinct pieces from the side panels;

E) the panel inserts disposed in respective openings between the second roof panel and the respective side panels when the second roof panel is in the final-assembled position to close respective openings relative to the cargo compartment;

F) at least one of the panel inserts disposed in at least one of the openings between the second roof panel and the first roof panel when the second roof panel is in the final-assembled position to close the respective openings relative to the passenger compartment;

G) the panel inserts include a first insert, a second insert, a third insert and a fourth insert, with the first and second inserts each defining a first length, and the third and fourth inserts each defining a second length, with the second length of the third and fourth inserts being less than the first length of the first and second inserts;

H) the first, second and fourth inserts disposed between the second roof panel and the respective side panels when the second roof panel is in the final-assembled position;

I) the third insert is disposed between the first and second roof panels when the second roof panel is in the final-assembled position;

J) at least one of the side panels defines a first aperture, and the body structure includes a first door;

K) the first insert defines a first recess aligning with the first aperture of the at least one of the side panels;

L) the first door movably coupled to the body structure in the first aperture and the first recess when the second roof panel is in the final-assembled position;

M) at least another one of the side panels defines a second aperture spaced from the first aperture, and the body structure includes a second door;

N) the fourth insert defines a second recess aligning with the second aperture;

O) the second door is movably coupled to the body structure in the second aperture and the second recess when the second roof panel is in the final-assembled position;

P) the second insert and the third insert are each characterized by the absence of a recess to receive part of a door;

Q) at least a pair of the side panels oppose each other along a length of the vehicle;

R) another one of the side panels disposed in a cross-car direction which is transverse to the length of the vehicle;

S) the third insert fixed to the first roof panel and the second roof panel in the cross-car direction when the second roof panel is in the final-assembled position;

T) one of the at least pair of side panels is further defined as a left-hand side panel and another one of the at least pair of side panels is further defined as a right-hand side panel;

U) the left-hand and right-hand side panels oppose each other along the length of the vehicle;

V) the first and second inserts are each fixed to the second roof panel and respective left-hand and right-hand side panels when the second roof panel is in the final-assembled position;

W) the another one of the side panels is further defined as a rear panel;

X) the rear panel disposed in the cross-car direction;

Y) the fourth insert fixed to the second roof panel and the rear panel when the second roof panel in the final-assembled position;

Z) the second roof panel includes a flange extending outwardly away from the second roof panel;

AA) the extensions include a respective first bracket each defining a first groove open in a first direction;

BB) the side panels include at least one second bracket each defining a second groove open in a second direction;

CC) the first and second directions are different from each other;

DD) the flange disposed between the second roof panel and the second bracket of the side panels when the second roof panel is in the pre-assembled position;

EE) the panel inserts being separate and distinct pieces from the second roof panel;

FF) the panel inserts disposed in respective openings when the second roof panel is in the final-assembled position;

GG) the panel inserts each include a first edge and a second edge spaced from each other;

HH) the first edge of the respective panel inserts being disposed in the first groove of the respective first bracket when the second roof panel is in the final-assembled position; and II) the second edge of the respective panel inserts being disposed in the second groove of the respective second bracket when the second roof panel is in the final-assembled position.

The present disclosure also provides a method of manufacturing a vehicle. The method includes providing a body structure defining a passenger compartment and a cargo compartment. The body structure includes a first roof panel disposed over at least part of the passenger compartment and includes a second roof panel disposed over at least part of the cargo compartment. The body structure also includes a plurality of side panels that surround at least the cargo compartment. The method also includes fixing a plurality of extensions to the second roof panel and coupling the extensions to the side panels. The extensions and the second roof panel are movable relative to the first roof panel and the side panels between a pre-assembled position and a final-assembled position. The second roof panel is disposed closer to the side panels when in the pre-assembled position than when in the final-assembled position.

The method optionally includes one or more of the following:

A) packaging a plurality of panel inserts inside the cargo compartment when the second roof panel is in the pre-assembled position to ship the vehicle;

B) coupling the extensions to the respective side panels when the second roof panel is in the pre-assembled position to ship the vehicle;

C) uncoupling the extensions from the respective side panels after shipment of the vehicle;

D) raising the second roof panel to the final-assembled position after uncoupling the extensions;

E) coupling the extensions to the respective side panels after raising the second roof panel to the final-assembled position to space the second roof panel from the side panels and the first roof panel to define a plurality of openings;

F) removing the panel inserts from the cargo compartment; and

G) securing the panel inserts to the respective openings.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
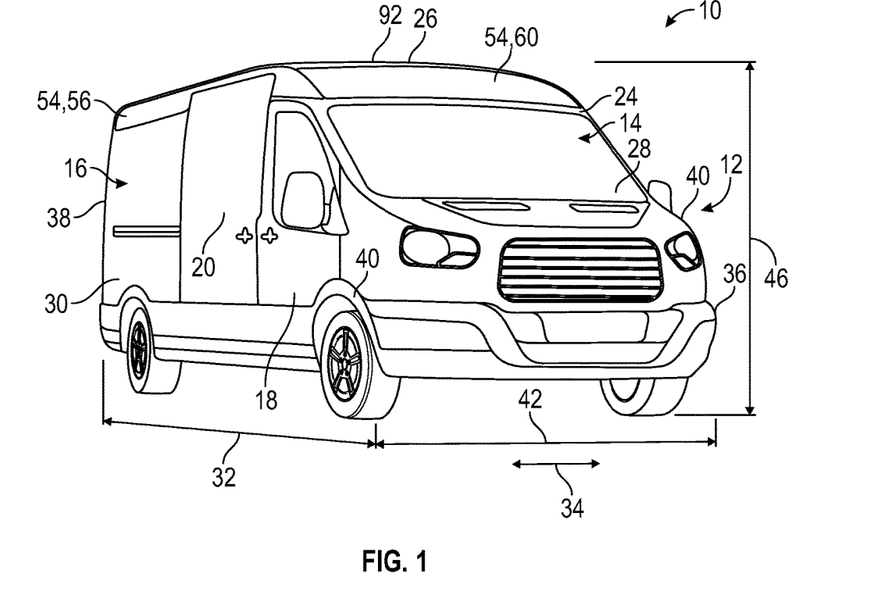
FIG. 1 is a schematic perspective view of a vehicle.

Referring to the FIGS., wherein like numerals indicate like or corresponding parts throughout the several views, a vehicle 10 is generally shown in FIG. 1. Generally, this vehicle 10 is convertible from a standard roof line vehicle for transportation purposes from the manufacturer to a high roof line vehicle at a dealership to sell the vehicle 10.

Non-limiting examples of the vehicle 10 can include vans, cargo vans, trucks, recreational vehicles, boats, farm equipment or any other suitable movable platform. Additionally, the vehicle 10 can include autonomously driven vehicles or vehicles driven via a human. Furthermore, the vehicle 10 can be an electric vehicle, a hybrid vehicle, etc. Non-limiting examples of the non-vehicles can include machines, farm equipment or any other suitable non-vehicle.

Figure 2:
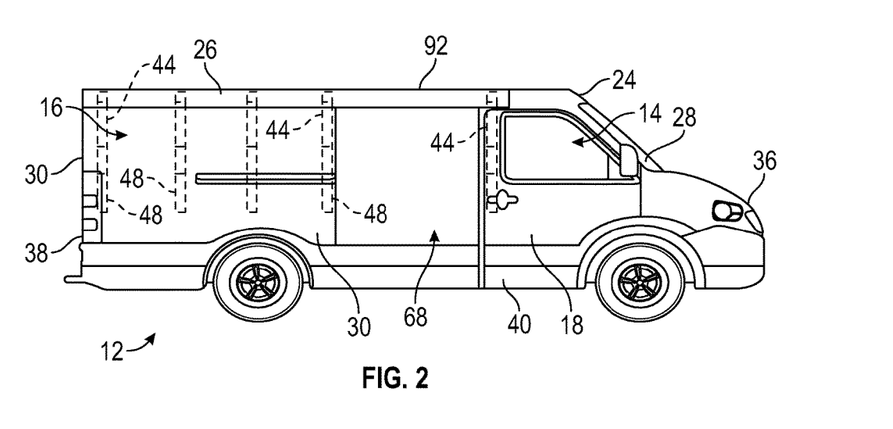
FIG. 2 is a schematic side view of the vehicle of FIG. 1 with a second roof panel in a pre-assembled position.

Referring to FIGS. 1 and 2, the vehicle 10 includes a body structure 12 defining a passenger compartment 14 and a cargo compartment 16. The passenger compartment 14 can be an area where one or more passengers can ride in the vehicle 10 and/or steer/drive the vehicle 10. Generally, the passenger compartment 14 is accessible by one or more doors 18. Therefore, when the passenger desires to enter or exit the passenger compartment 14, the passenger opens or closes the doors 18 to allow ingress or egress. As such, the door(s) 18 are movable between an open position and a closed position relative to the passenger compartment 14. FIGS. 1 and 2 illustrate the doors 18 in the closed position.

The cargo compartment 16 can be an area where items/cargo are stored for transportation. In certain embodiments, the cargo compartment 16 can be connected to the passenger compartment 14 via a walkway inside the vehicle 10. Therefore, in this embodiment, the passenger of the vehicle 10 can move between the passenger compartment 14 and the cargo compartment 16 without exiting the vehicle 10. In other embodiments, the cargo compartment 16 can be separated from the passenger compartment 14. In other words, to enter the cargo compartment 16, the passenger of the vehicle 10 exits the passenger compartment 14 via one of the doors 18 to the outside of the vehicle 10 and then enters the cargo compartment 16 via another entrance.

Regardless of which way the cargo compartment 16 can be accessed relative to the passenger compartment 14, the body structure 12 can further include a first door 20, and in certain embodiments, optionally, a second door 22. Generally, the first and second doors 20, 22 can be movably coupled to the cargo compartment 16 to allow ingress or egress of the cargo compartment 16. The first and second doors 20, 22 can be disposed inside the cargo compartment 16 for shipping purposes, and removed from the cargo compartment 16 when the final assembly of the vehicle 10 is being performed.

Continuing with to FIG. 1, the body structure 12 includes a first roof panel 24 disposed over at least part of the passenger compartment 14 and includes a second roof panel 26 disposed over at least part of the cargo compartment 16. Generally, the first roof panel 24 is disposed above a windshield 28 of the vehicle 10. The first roof panel 24 can be attached to the A-pillars, and the windshield 28 can be disposed between the first roof panel 24 and the A-pillars. The first roof panel 24 is fixed, i.e., stationary, relative to the windshield 28 and the A-pillars.

Furthermore, the body structure 12 includes a plurality of side panels 30 that surround at least the cargo compartment 16. In certain embodiments, the side panels 30 can also surround at least part of the passenger compartment 14. One or more of the side panels 30 can be spaced from each other.

For example, at least a pair of the side panels 30 can oppose each other along a length 32 of the vehicle 10, and another one of the side panels 30 can be disposed in a cross-car direction 34 which is transverse to the length 32 of the vehicle 10. One or more of the side panels 30 can be different configurations from each other. It is to be appreciated that the side panels 30 can be any suitable configuration.

The length 32 of the vehicle 10 can be between a front end 36 and a rear end 38 of the vehicle 10, and the cross-car direction 34 can be between a pair of sides 40 of the vehicle 10. Therefore, the cross-car direction 34 can be defined as a width 42 of the vehicle 10. As such, for example, in certain embodiments, the length 32 of the vehicle 10 can be greater than the width 42 of the vehicle 10 in the cross-car direction 34.

Figure 3:
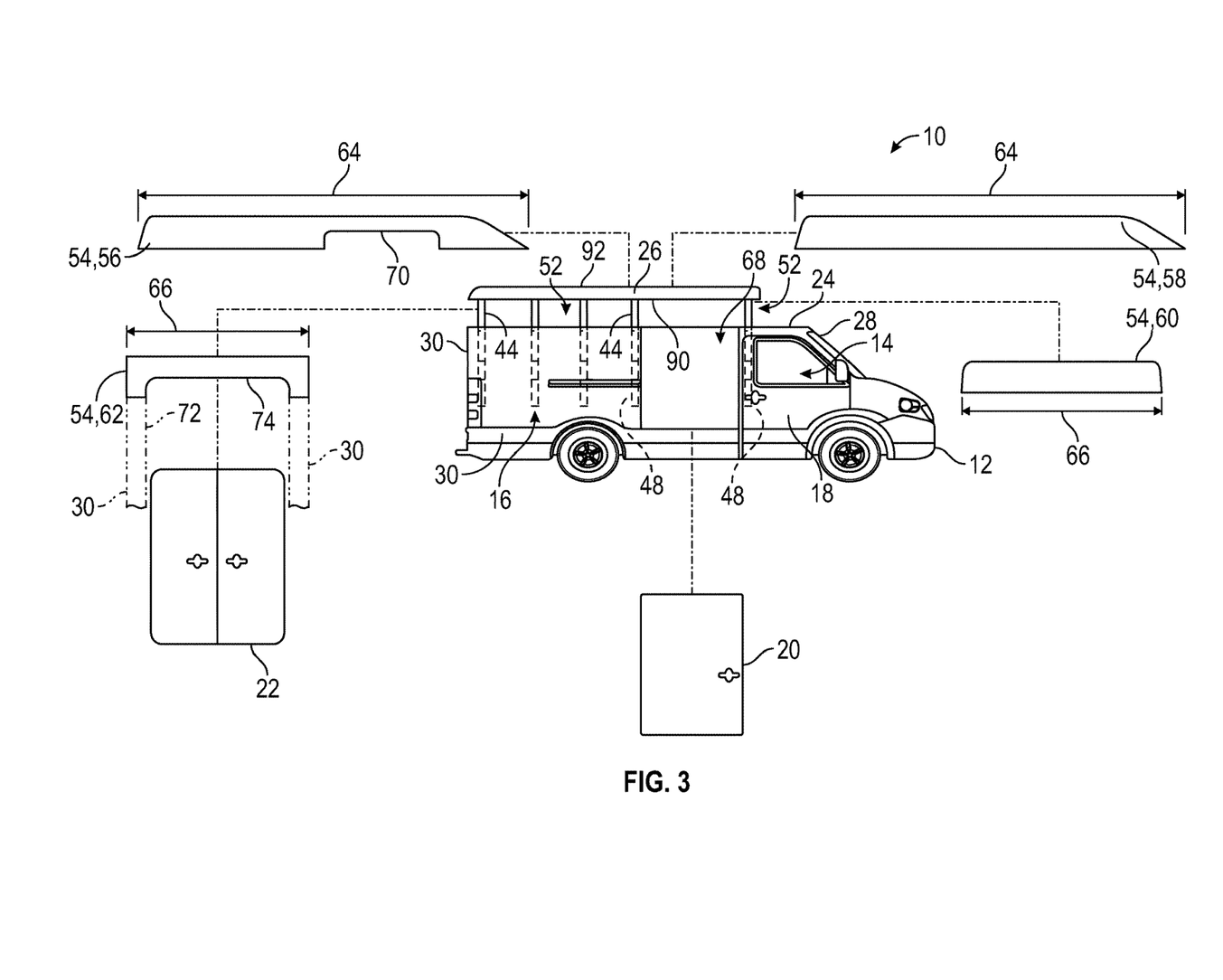
FIG. 3 is a schematic partial exploded view of the vehicle, with the second roof panel in a final-assembled position.
Figures 4, 5, 6:
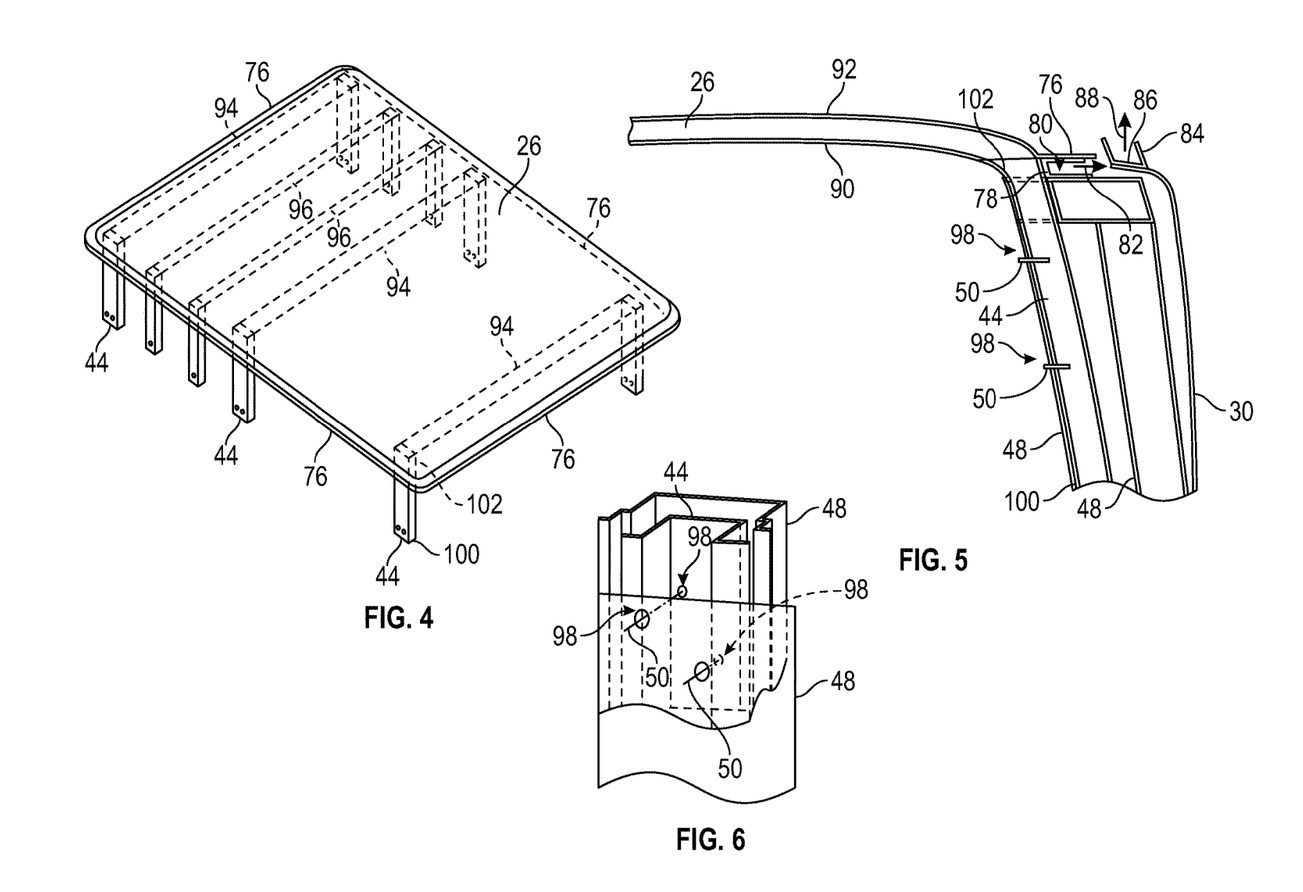
FIG. 4 is a schematic perspective view of the second roof panel.
FIG. 5 is a schematic fragmentary illustration of the second roof panel in the pre-assembled position.
FIG. 6 is a schematic fragmentary perspective view of an extension and a frame portion fastened to each other.

Referring to FIGS. 2-4, the vehicle 10 also includes a plurality of extensions 44 fixed to the second roof panel 26 and coupled to the side panels 30. The extensions 44 and the second roof panel 26 are movable relative to the first roof panel 24 and the side panels 30 between a pre-assembled position and a final-assembled position. Generally, the second roof panel 26 is disposed closer to the side panels 30 when in the pre-assembled position than when in the final-assembled position. As such, the second roof panel 26 is spaced farther from the side panels 30 when in the final-assembled position than when in the pre-assembled position. The pre-assembled position is shown in FIGS. 2 and 5, and the final-assembled position is shown in FIGS. 1, 3, 7 and 8.

The second roof panel 26 is disposed in the pre-assembled position at the manufacturing facility for shipping purposes. The pre-assembled position of the second roof panel 26 allows a height 46 of the vehicle 10 to be at or below a standard height size such that the vehicle 10 can be manufactured at a plant utilizing traditional vehicle equipment and/or can be transported on a traditional vehicle trailer and/or traditional rail cars. In other words, custom assembly equipment configured to accommodate vehicles 10 taller than, for example, a standard consumer pickup truck is not needed at the plant, and/or a custom trailer/rail car configured to accommodate vehicles 10 taller than, for example, the standard consumer pickup truck is not needed. Therefore, manufacturing costs and/or shipping costs can be reduced by utilizing the convertible vehicle 10 described herein. Once the vehicle 10 arrives at its final destination in the pre-assembled position, the second roof panel 26 can be moved to the final-assembled position to complete the final assembly of the vehicle 10.

The vehicle 10 can include a plurality of frame portions 48, such as pillars, to secure the second roof panel 26 in the pre-assembled position for shipping purposes. The side panels 30 are secured to the frame portions 48 such that the side panels 30 are stationary relative to the frame portions 48.

The frame portions 48 can be any suitable configuration and can be any suitable location relative to the respective extensions 44. For example, each of the frame portions 48 can be configured as one-piece or a plurality of pieces. As best shown in FIG. 6, for example, each of the frame portions 48 can include more than one piece, and the respective extensions 44 can be disposed between the pieces of the respective frame portions 48. In other words, the pieces of the frame portions 48 can cooperate to define a pocket, and the respective extensions 44 can be movable inside the pocket. As another example, each of the frame portions 48 can be one piece, and therefore, the frame portions 48 do not have the pocket. In this configuration, each of the frame portions 48 can be in front of or behind the respective extensions 44. FIG. 6 can be illustrative of any of the frame portions 48 and the extensions 44 described herein.

Specifically, the extensions 44 and the respective frame portions 48 can be secured to each other via fasteners 50 (see FIGS. 5-7) when the second roof panel 26 is in the pre-assembled position, which maintains the second roof panel 26 in the pre-assembled position for shipping purposes. The side panels 30 are disposed over the frame portions 48 such that the frame portions 48 are not visible from outside of the vehicle 10. Any suitable configuration of fasteners 50 can be utilized, and non-limiting examples can include, bolts, screws, clips, couplers, tabs, tacks, grips, pins, etc.

The first and second doors 20, 22 are not pre-assembled to the vehicle 10 when the second roof panel 26 is in the pre-assembled position because the doors 20, 22 are taller than the side panels 30, and the taller doors 20, 22 would not allow the second roof panel 26 to be lowered to the desired position for shipping purposes. Therefore, the first and second doors 20, 22 are not pre-assembled to the vehicle 10 to allow the second roof panel 26 to rest adjacent a top of the side panels 30.

As best shown in FIG. 3, the second roof panel 26 can be spaced from the side panels 30 and the first roof panel 24 when the second roof panel 26 is in the final-assembled position to define a plurality of openings 52. In certain embodiments, the openings 52 can be disposed around at least the cargo compartment 16. In other embodiments, the openings 52 are disposed around both the passenger compartment 14 and the cargo compartment 16.

Continuing with to FIG. 3, the body structure 12 can include a plurality of panel inserts 54 which are separate and distinct pieces from the side panels 30. Furthermore, the panel inserts 54 can be separate and distinct pieces from the second roof panel 26. The panel inserts 54 can be disposed inside the cargo compartment 16 for shipping purposes, and removed from the cargo compartment 16 when the final assembly of the vehicle 10 is being performed.

The panel inserts 54 can be disposed in respective openings 52 between the second roof panel 26 and the respective side panels 30 when the second roof panel 26 is in the final-assembled position to close respective openings 52 relative to the cargo compartment 16. Furthermore, at least one of the panel inserts 54 can be disposed in at least one of the openings 52 between the second roof panel 26 and the first roof panel 24 when the second roof panel 26 is in the final-assembled position to close the respective openings 52 relative to the passenger compartment 14. The panel inserts 54 are secured to the vehicle 10 relative to the respective openings 52, which will be further discussed below. The panel inserts 54 cooperate with the side panels 30 and the roof panels 24, 26 to contain the cargo compartment 16 and the passenger compartment 14.

Any suitable number of panel inserts 54 can be utilized. For illustrative purposes only, one suitable example is discussed below and shown in the FIGS. In certain embodiments, the panel inserts 54 can include a first insert 56, a second insert 58, a third insert 60 and a fourth insert 62. The first and second inserts 56, 58 can each define a first length 64. The third and fourth inserts 60, 62 can each define a second length 66. Generally, the second length 66 of the third and fourth inserts 60, 62 is less than the first length 64 of the first and second inserts 56, 58. The lengths 64, 66 of the panel inserts 54 can be any suitable length depending on the desired length 32 and the desired width 42 of the vehicle 10.

The first and second inserts 56, 58 can be disposed along the length 32 of the vehicle 10, and the third and fourth inserts 60, 62 can be disposed along the width 42 of the vehicle 10. The first, second and fourth inserts 56, 58, 62 can be disposed between the second roof panel 26 and the respective side panels 30 when the second roof panel 26 is in the final-assembled position. Furthermore, the third insert 60 can be disposed between the first and second roof panels 24, 26 when the second roof panel 26 is in the final-assembled position.

Said differently, in certain embodiments, one of the at least pair of side panels 30 can be further defined as a left-hand side panel, and another one of the at least pair of side panels 30 can be further defined as a right-hand side panel. The left-hand and right-hand side panels can oppose each other along the length 32 of the vehicle 10. The first and second inserts 56, 58 are each fixed to the second roof panel 26 and respective left-hand and right-hand side panels when the second roof panel 26 is in the final-assembled position.

Furthermore, in certain embodiments, the another one of the side panels 30 can be further defined as a rear panel. The rear panel can be disposed in the cross-car direction 34. Said differently, the rear panel can be disposed along the width 42 of the vehicle 10. The fourth insert 62 can be fixed to the second roof panel 26 and the rear panel when the second roof panel 26 in the final-assembled position.

In certain embodiments, some of the panel inserts 54 can be the same configuration, and in other embodiments, all of the panel inserts 54 have different configurations. It is to be appreciated that the panel inserts 54 can be any suitable configuration. For illustrative purposes only, one suitable example is discussed below and shown in the FIGS.

The side panels 30 and/or the panel inserts 54 can be configured to accommodate one or more doors 20, 22, one or more windows, no windows, etc. For the below example, the side panels 30 and the panel inserts 54 accommodate the first door 20 and the second door 22.

In certain embodiments, at least one of the side panels 30 can define a first aperture 68. The first insert 56 can define a first recess 70 aligning with the first aperture 68 of the at least one of the side panels 30. Therefore, when the first insert 56 is secured in the respective opening 52, the first aperture 68 and the first recess 70 cooperate to accommodate the first door 20. The first door 20 can be movably coupled to the body structure 12 in the first aperture 68 and the first recess 70 when the second roof panel 26 is in the final-assembled position. In certain embodiments, the first door 20 can be movably coupled to one of the side panels 30. As shown in the FIGS., the first door 20 can be a sliding door. It is to be appreciated that the first door 20 can be other configurations, such as a swinging door, a plurality of doors 20, 22, a roll-up door, etc.

In various embodiments, at least another one of the side panels 30 can define a second aperture 72 spaced from the first aperture 68. The another one of the side panels 30 and the second aperture 72 is shown in phantom lines in FIG. 3 for illustrative purposes in relation to the fourth insert 62, while it is to be appreciated that the phantom side panel 30 is disposed at the rear end 38 of the vehicle 10. This side panel 30 can be defined as the rear panel. The fourth insert 62 can define a second recess 74 aligning with the second aperture 72. Therefore, when the fourth insert 62 is secured in the respective opening 52, the second aperture 72 and the second recess 74 cooperate to accommodate the second door 22. The second door 22 can be movably coupled to the body structure 12 in the second aperture 72 and the second recess 74 when the second roof panel 26 is in the final-assembled position. In certain embodiments, the second door 22 can be movably coupled to one of the side panels 30. As shown in the FIGS., the second door 22 can be a swinging door. It is to be appreciated that the second door 22 can be other configurations, such as a sliding door, a plurality of doors 20, 22, a roll-up door, etc. Furthermore, the second door 22 can be split into two halves that are movably coupled to the body structure 12/the side panels 30.

In certain embodiments, the second insert 58 and the third insert 60 are each characterized by the absence of a recess to receive part of a door. Said differently, the second and third inserts 58, 60 do not accommodate a door. For example, the second and third inserts 58, 60 do not accommodate the first or second doors 20, 22. The second insert 58 can be disposed along the length 32 of the vehicle 10. In other words, the second insert 58 is disposed in one of the openings 52 along the length 32 of the vehicle 10. Correspondingly, the side panel 30 along the same side 40 of the vehicle 10 as the second insert 58 can be characterized by the absence of an aperture to receive part of the door. Therefore, the vehicle 10 can be configured such that one side 40 of the vehicle 10 does not have a door.

The third insert 60 can be fixed to the first roof panel 24 and the second roof panel 26 in the cross-car direction 34 when the second roof panel 26 is in the final-assembled position. Said differently, the third insert 60 can be disposed along the width 42 of the vehicle 10. More specifically, the third insert 60 is disposed in one of the openings 52 along the width 42 of the vehicle 10.

As best shown in FIGS. 4, 5, 7 and 8, the second roof panel 26 can include a flange 76 extending outwardly away from the second roof panel 26. More specifically, the flange 76 can extend outwardly away from the inside of the vehicle 10. The flange 76 can overhang relative to the side panels 30/the first roof panel 24. In certain embodiments, the flange 76 can be continuous to completely surround the second roof panel 26. In other embodiments, the flange 76 can be defined as a plurality of flanges 76, one or more of which, can be spaced from each other and/or abut each other around the second roof panel 26.

Figure 7:
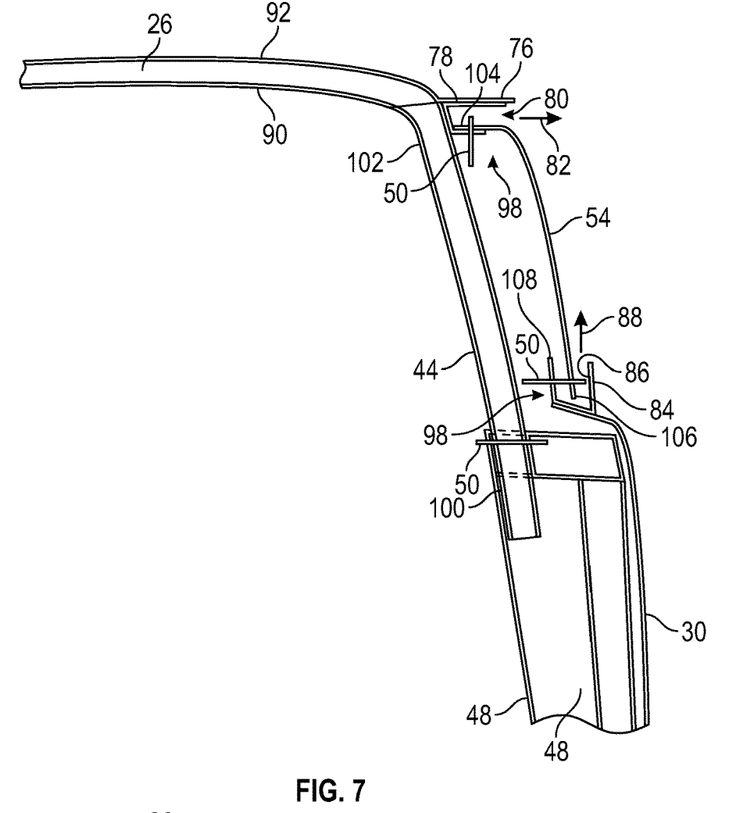
FIG. 7 is a schematic fragmentary illustration of the second roof panel in the final-assembled position, with a panel insert disposed between the second roof panel and a side panel.
Figure 8:
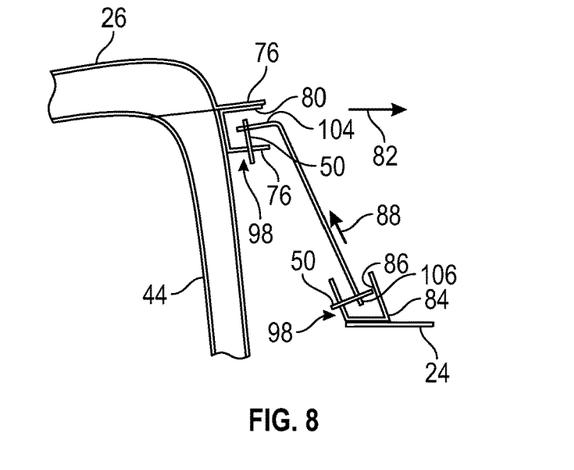
FIG. 8 is a schematic fragmentary illustration of the second roof panel in the final-assembled position, with a panel insert disposed between the second roof panel and a first roof panel.

Turning to FIGS. 5, 7 and 8, the extensions 44 can include a respective first bracket 78 each defining a first groove 80 open in a first direction 82 (see arrow labeled 82). It is to be appreciated that some or all of the extensions 44 can include the respective first bracket 78. Furthermore, the side panels 30 can include at least one second bracket 84 each defining a second groove 86 open in a second direction 88 (see arrow labeled 88). Additionally, the first roof panel 24 can include at least one second bracket 84 defining the second groove 86 open in the second direction 88. It is to be appreciated that each of the side panels 30 can include one or more second brackets 84.

Generally, the first and second directions 82, 88 are different from each other. For example, the first direction 82 can face outwardly relative to respective side panels 30 of the vehicle 10, and the second direction 88 can face outwardly relative to the second roof panel 26. Simply stated, the first groove 80 can be opened sideways, which can be generally horizontal, relative to the respective sides 40 of the vehicle 10, and the second groove 86 can be opened upwardly relative to the second roof panel 26. Therefore, in certain embodiments, the first and second grooves 80, 86 can be open at about 90 degrees relative to each other. In other embodiments, such as along the first roof panel 24, the first and second grooves 80, 86 are disposed at angles other than 90 degrees (see FIG. 8). It is to be appreciated that the first and second grooves 80, 86 can be in any suitable location, and the first and second directions can be any suitable angle relative to each other.

Referring to FIGS. 1, 5 and 7, the second roof panel 26 can include an inner surface 90 and an outer surface 92. The outer surface 92 can face outwardly toward the outside of the vehicle 10, and the inner surface 90 can face inwardly toward the inside of the vehicle 10. In certain embodiments, the flange 76 extends from the outer surface 92 of the second roof panel 26 away from the inner surface 90.

The extensions 44 can be fixed to the second roof panel 26 from the inner and/or outer surfaces 90, 92. The flange 76 around the second roof panel 26 can extend beyond the outer surface 92 to hang over the extensions 44. Therefore, the flange 76 extends beyond the extensions 44. Furthermore, each of the extensions 44 can be spaced from each other around the second roof panel 26, or one or more of the extensions 44 can be fixed to each other. In certain embodiments, some of the extensions 44 are spaced from each other and some are fixed to each other.

The vehicle 10 can optionally include a brace 94 disposed between a pair of the extensions 44 to support the second roof panel 26. The brace 94 can be attached to the inner surface 90 of the second roof panel 26 and/or the pair of extensions 44. Therefore, in certain embodiments, the pair of extensions 44 and the brace 94 can form a generally u-shaped configuration that extends from one side 40 of the vehicle 10 to the other side 40 of the vehicle 10. It is to be appreciated that one or more braces 94 can be utilized.

In addition to the brace 94, or alternatively, the vehicle 10 can optionally include a cross-bar 96 attached to the inner surface 90 of the second roof panel 26 to support the second roof panel 26. The cross-bars 96 can be coupled to respective frame portions 48, and for shipping purposes, the cross-bars 96 and the frame portions 48 can be secured to each other. The cross-bar 96 can optionally be a generally u-shaped configuration. It is to be appreciated that one or more cross-bars 96 can be utilized. It is to also be appreciated that these structures supporting the second roof panel 26 can be referred to as a roof bow. Furthermore, it is to be appreciated that one or more of the cross-bars 96 can include the respective first bracket 78.

As discussed above, the second roof panel 26 is movable relative to the respective side panels 30. Therefore, the location of the flange 76 changes depending on the position of the second roof panel 26. As such, referring to FIG. 5, the flange 76 can be disposed between the second roof panel 26 and the second bracket 84 of the side panels 30 when the second roof panel 26 is in the pre-assembled position. In other embodiments, the flange 76 can be disposed over the second bracket 84 when the second roof panel 26 is in the pre-assembled position. Referring to FIGS. 7 and 8, the flange 76 can be spaced above the second groove 86 when the second roof panel 26 is in the final-assembled position. Additionally, the flange 76 hangs over the first bracket 78 when the second roof panel 26 is in the pre-assembled position and the final-assembled position. In other words, the first bracket 78 can be disposed below the flange 76 when the second roof panel 26 is in the pre-assembled position and the final-assembled position.

When it is desired to raise the second roof panel 26 to the final-assembled position, the fasteners 50 are removed from the extensions 44 and the frame portions 48 to facilitate such movement. Once the second roof panel 26 is disposed in the final-assembled position, which also raises the extensions 44 relative to the side panels 30, fasteners 50 again secure the extensions 44 and the frame portions 48 together. The extensions 44 can include one or more fastening features 98 in different locations to accommodate the pre-assembled position and the final-assembled position. For example, as best shown in FIG. 4, the extensions 44 can include a first end 100 and a second end 102 spaced from each other relative to the height 46 of the vehicle 10. One or more of the fastening features 98 can be disposed at the first end 100 and one or more of the fastening features 98 can be disposed at the second end 102, and/or anywhere between the first and second ends 100, 102. The extensions 44 can be any suitable length between the first and second ends 100, 102, and the fastening features 98 can be at any suitable location along the extension 44 to position the second roof panel 26 at a desired height relative to the side panels 30 when in the final-assembled position. As such, the final height 46 of the vehicle 10 can be any suitable height depending on the desired final product.

The position of the frame portions 48 remain stationary, so the frame portions 48 can include one or more fastening features 98 which remains in the same location regardless of the pre-assembled and final-assembled positions. The fastening features 98 can be any suitable configuration depending on the type of fasteners being utilized, and non-limiting examples can include holes, recesses, grooves, projections, tabs, grips, etc.

Once the second roof panel 26 is secured in the final-assembled position via the fasteners 50, the panel inserts 54 can be disposed in the respective openings 52. Referring to FIGS. 7 and 8, the panel inserts 54 can each include a first edge 104 and a second edge 106 spaced from each other. Generally, the panel inserts 54 can be disposed in respective openings 52 when the second roof panel 26 is in the final-assembled position. More specifically, the first edge 104 of the respective panel inserts 54 can be disposed in the first groove 80 of the respective first bracket 78 when the second roof panel 26 is in the final-assembled position, and the second edge 106 of the respective panel inserts 54 can be disposed in the second groove 86 of the respective second bracket 84 when the second roof panel 26 is in the final-assembled position.

Fasteners 50 are then utilized to secure the respective panel inserts 54 to the respective first and second brackets 78, 84. Furthermore, the first and second brackets 78, 84 can include one or more fastening features 98. Due to the different orientations of the first and second brackets 78, 84, the fasteners 50 secured to the first brackets 78 can be disposed in a different orientation from the fasteners 50 secured to the second brackets 84. Generally, the fasteners 50 secured to the respective second brackets 84 are disposed below an outer edge 108 of the bracket, and thus, are not visible from the outside of the vehicle 10. Any suitable configuration of fasteners 50 can be utilized, and non-limiting examples can include, bolts, screws, clips, couplers, tabs, tacks, grips, pins, etc. The fastening features 98 can be any suitable configuration depending on the type of fasteners being utilized, and non-limiting examples can include holes, recesses, grooves, projections, tabs, grips, etc.

The present disclosure also includes a method of manufacturing the vehicle 10. The method includes providing the body structure 12 defining the passenger compartment 14 and the cargo compartment 16. As discussed above, the body structure 12 includes the first roof panel 24 disposed over at least part of the passenger compartment 14 and includes the second roof panel 26 disposed over at least part of the cargo compartment 16. Also, as discussed above, the body structure 12 includes the side panels 30 that surround at least the cargo compartment 16.

The method further includes fixing the plurality of extensions 44 to the second roof panel 26 and coupling the extensions 44 to the side panels 30. The second roof panel 26 and the extensions 44 can be preassembled before being coupled to the side panels 30, and specifically, movably coupled to the respective frame portions 48.

As discussed above, the extensions 44 and the second roof panel 26 are movable relative to the first roof panel 24 and the side panels 30 between the pre-assembled position and the final-assembled position. As also discussed above, the second roof panel 26 is disposed closer to the side panels 30 when in the pre-assembled position than when in the final-assembled position. Therefore, the second roof panel 26 and the extensions 44 move in unison between the pre-assembled and final-assembled positions.

The method can also include packaging the plurality of panel inserts 54 inside the cargo compartment 16 when the second roof panel 26 is in the pre-assembled position to ship the vehicle 10. Additionally, one or more doors 20, 22 can be packaged inside the cargo compartment 16 when the second roof panel 26 is in the pre-assembled position to ship the vehicle 10. For example, the first and second doors 20, 22 can be packaged inside the cargo compartment 16. The method can include coupling the extensions 44 to the respective side panels 30 when the second roof panel 26 is in the pre-assembled position to ship the vehicle 10. More specifically, the extensions 44 and the frame portions 48 are secured to each other to ship the vehicle 10. Therefore, when the vehicle 10 is in the pre-assembled position for shipping purposes, the vehicle 10 can be shipped via standard vehicle 10 shipping equipment, and custom designed shipping equipment is not needed.

Before shipment of the vehicle 10 in the pre-assembled position, optionally, one or more temporary seals can be place around the flange 76 of the second roof panel 26 for shipping purposes. Additionally, optionally, one or more covers can be disposed over the first and second apertures 68, 72 to close the apertures 68, 72 for shipping purposes.

After the second roof panel 26 is secured in the pre-assembled position, and the desired items, such as the panel inserts 54, the doors 20, 22, etc., are secured in the cargo compartment 16, the partially assembled vehicle 10 is ready for shipment to another facility. Therefore, the method can include shipping the vehicle 10 to another facility. The another facility can include, as non-limiting examples, a dealership, a storage facility, a customer, etc.

Once the vehicle 10 arrives at another facility, the vehicle 10 can be finally assembled. Therefore, the method can include uncoupling the extensions 44 from the respective side panels 30 after shipment of the vehicle 10. More specifically, the extensions 44 and the frame portions 48 are unsecured from each other. Additionally, the method can include raising the second roof panel 26 to the final-assembled position after uncoupling the extensions 44 and coupling the extensions 44 to the respective side panels 30 after raising the second roof panel 26 to the final-assembled position to space the second roof panel 26 from the side panels 30 and the first roof panel 24 to define the plurality of openings 52. Therefore, the height 46 of the vehicle 10 increases when in the final-assembled position as compared to the pre-assembled position.

Once the second roof panel 26 is secured in the final-assembled position, the panel inserts 54 and the doors 20, 22 can be secured to the vehicle 10. The method can include removing the panel inserts 54 from the cargo compartment 16, and securing the panel inserts 54 to the respective openings 52. Additionally, the doors 20, 22 can be removed from the cargo compartment 16 and disposed in the first aperture 68 and the first recess 70, and the second aperture 72 and the second recess 74. Furthermore, the temporary seals and covers utilized during shipment can be removed and optionally, one or more final-assembly seals can be place around the flange 76 of the second roof panel 26. In addition, optionally, one or more door seals can be placed around the respective recesses 70, 74/apertures 68, 72 and/or the first and second doors 20, 22.

It is to be appreciated that the other orders or sequences of the method are within the scope of the present teachings. Furthermore, it is to also be appreciated that the method can include other features not specifically discussed above for "the method".

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A vehicle comprising:
a body structure defining a passenger compartment and a cargo compartment;
wherein the body structure includes a first roof panel disposed over at least part of the passenger compartment and includes a second roof panel disposed over at least part of the cargo compartment;
wherein the body structure includes a plurality of side panels that surround at least the cargo compartment;
a plurality of extensions fixed to the second roof panel and coupled to the side panels, with the extensions and the second roof panel movable relative to the first roof panel and the side panels between a pre-assembled position and a final-assembled position; and
wherein:
the second roof panel is disposed closer to the side panels when in the pre-assembled position than when in the final-assembled position;
the second roof panel is spaced from the side panels and the first roof panel when the second roof panel is in the final-assembled position to define a plurality of openings disposed around at least the cargo compartment;
the body structure includes a plurality of panel inserts which are separate and distinct pieces from the side panels, and wherein the panel inserts are disposed in respective openings between the second roof panel and the respective side panels when the second roof panel is in the final-assembled position to close the respective openings relative to the cargo compartment;
the panel inserts include a first insert, a second insert, a third insert and a fourth insert, with the first and second inserts each defining a first length, and the third and fourth inserts each defining a second length, with the second length of the third and fourth inserts being less than the first length of the first and second inserts; and at least a pair of the side panels oppose each other along a length of the vehicle, wherein another one of the side panels is disposed in a cross-car direction which is transverse to the length of the vehicle, and wherein the third insert is fixed to the first roof panel and the second roof panel in the cross-car direction when the second roof panel is in the final-assembled position.

2. The vehicle as set forth in claim 1 wherein the panel inserts are disposed around both of the passenger compartment and the cargo compartment.

3. The vehicle as set forth in claim 1 wherein at least one of the panel inserts is disposed in at least one of the openings between the second roof panel and the first roof panel when the second roof panel is in the final-assembled position to close the respective openings relative to the passenger compartment.

4. The vehicle as set forth in claim 1 wherein the first, second and fourth inserts are disposed between the second roof panel and the respective side panels when the second roof panel is in the final-assembled position, and wherein the third insert is disposed between the first and second roof panels when the second roof panel is in the final-assembled position.

5. The vehicle as set forth in claim 1 wherein at least one of the side panels defines a first aperture, and the body structure includes a first door, wherein the first insert defines a first recess aligning with the first aperture of the at least one of the side panels, and wherein the first door is movably coupled to the body structure in the first aperture and the first recess when the second roof panel is in the final-assembled position.

6. The vehicle as set forth in claim 5 wherein at least another one of the side panels defines a second aperture spaced from the first aperture, and the body structure includes a second door, wherein the fourth insert defines a second recess aligning with the second aperture, and wherein the second door is movably coupled to the body structure in the second aperture and the second recess when the second roof panel is in the final-assembled position.

7. The vehicle as set forth in claim 1 wherein the second insert and the third insert are each characterized by the absence of a recess to receive part of a door.

8. The vehicle as set forth in claim 1 wherein one of the at least pair of the side panels is further defined as a left-hand side panel and another one of the at least pair of the side panels is further defined as a right-hand side panel, wherein the left-hand and right-hand side panels oppose each other along the length of the vehicle, and wherein the first and second inserts are each fixed to the second roof panel and respective left-hand and right-hand side panels when the second roof panel is in the final-assembled position.

9. The vehicle as set forth in claim 1 wherein the another one of the side panels is further defined as a rear panel, wherein the rear panel is disposed in the cross-car direction, and wherein the fourth insert is fixed to the second roof panel and the rear panel when the second roof panel in the final-assembled position.

10. The vehicle as set forth in claim 1 wherein the second roof panel includes a flange extending outwardly away from the second roof panel.

11. The vehicle as set forth in claim 10 wherein:
the extensions include a respective first bracket each defining a first groove open in a first direction;
the side panels include at least one second bracket each defining a second groove open in a second direction;
the first and second directions are different from each other; and
the flange is disposed between the second roof panel and the second bracket of the side panels when the second roof panel is in the pre-assembled position.

12. The vehicle as set forth in claim 11 wherein:
the second roof panel is spaced from the side panels and the first roof panel when the second roof panel is in the final-assembled position to define a plurality of openings;
the body structure includes a plurality of panel inserts which are separate and distinct pieces from the second roof panel, and the panel inserts are disposed in respective openings when the second roof panel is in the final-assembled position;
the panel inserts each include a first edge and a second edge spaced from each other; and
the first edge of the respective panel inserts are disposed in the first groove of the respective first bracket when the second roof panel is in the final-assembled position, and the second edge of the respective panel inserts are disposed in the second groove of the respective second bracket when the second roof panel is in the final-assembled position.

13. A method of manufacturing a vehicle, the method comprising:
providing a body structure defining a passenger compartment and a cargo compartment, wherein the body structure includes a first roof panel disposed over at least part of the passenger compartment and includes a second roof panel disposed over at least part of the cargo compartment, and wherein the body structure includes a plurality of side panels that surround at least the cargo compartment;
fixing a plurality of extensions to the second roof panel;
wherein the extensions and the second roof panel are movable relative to the first roof panel and the side panels between a pre-assembled position and a final-assembled position;
wherein the second roof panel is disposed closer to the side panels when in the pre-assembled position than when in the final-assembled position;
coupling the extensions to the respective side panels and the passenger compartment when the second roof panel is in the pre-assembled position to ship the vehicle; and
packaging a plurality of panel inserts inside the cargo compartment when the second roof panel is in the pre-assembled position to ship the vehicle, wherein the panel inserts are completely separated from the second roof panel to package the panel inserts inside the cargo compartment.

14. The method as set forth in claim 13 further comprising:
uncoupling the extensions from the respective side panels after shipment of the vehicle;
raising the second roof panel to the final-assembled position after uncoupling the extensions; and
coupling the extensions to the respective side panels after raising the second roof panel to the final-assembled position to space the second roof panel from the side panels and the first roof panel to define a plurality of openings.

15. The method as set forth in claim 14 further comprising:

removing the panel inserts from the cargo compartment; and securing the panel inserts to the respective openings.

16. A vehicle comprising:

a body structure defining a passenger compartment and a cargo compartment;

wherein the body structure includes a first roof panel disposed over at least part of the passenger compartment and includes a second roof panel disposed over at least part of the cargo compartment;

wherein the body structure includes a plurality of side panels that surround at least the cargo compartment;

a plurality of extensions fixed to the second roof panel and coupled to the side panels, with the extensions and the second roof panel movable relative to the first roof panel and the side panels between a pre-assembled position and a final-assembled position; and wherein:

the second roof panel is disposed closer to the side panels when in the pre-assembled position than when in the final-assembled position;

the second roof panel includes a flange extending outwardly away from the second roof panel;

the extensions include a respective first bracket each defining a first groove open in a first direction;

the side panels include at least one second bracket each defining a second groove open in a second direction;

the first and second directions are different from each other; and the flange is disposed between the second roof panel and the second bracket of the side panels when the second roof panel is in the pre-assembled position.

17. The vehicle as set forth in claim 16 wherein the second roof panel is spaced from the side panels and the first roof panel when the second roof panel is in the final-assembled position to define a plurality of openings disposed around at least the cargo compartment.

18. The vehicle as set forth in claim 17 wherein the body structure includes a plurality of panel inserts which are separate and distinct pieces from the side panels, and wherein the panel inserts are disposed in respective openings between the second roof panel and the respective side panels when the second roof panel is in the final-assembled position to close the respective openings relative to the cargo compartment.

19. The vehicle as set forth in claim 18 wherein at least one of the panel inserts is disposed in at least one of the openings between the second roof panel and the first roof panel when the second roof panel is in the final-assembled position to close the respective openings relative to the passenger compartment.

20. The vehicle as set forth in claim 19 wherein the panel inserts include a first insert, a second insert, a third insert and a fourth insert, with the first and second inserts each defining a first length, and the third and fourth inserts each defining a second length, with the second length of the third and fourth inserts being less than the first length of the first and second inserts.

* * * * *